Figures 1, 3:
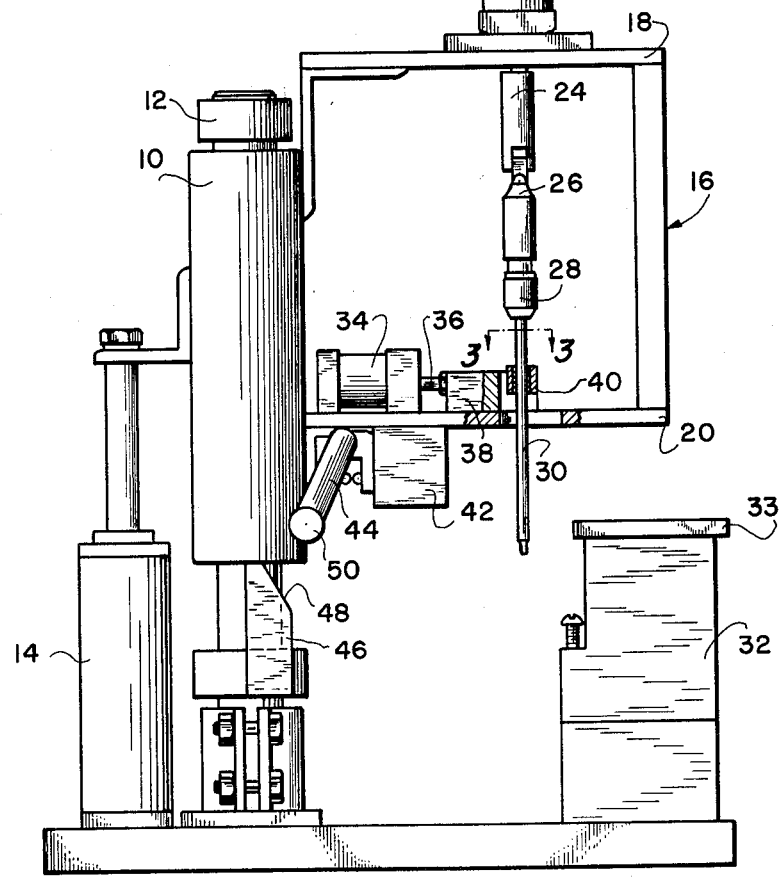

Feb. 2, 1965   J. M. STEADLE, JR   3,168,128
FASTENER DRIVING APPARATUS
Filed March 19, 1962   2 Sheets-Sheet 1

INVENTOR
JOHN M. STEADLE, JR.
BY
David W. Tillott
HIS ATTORNEY

United States Patent Office 3,168,128
Patented Feb. 2, 1965

3,168,128
FASTENER DRIVING APPARATUS
John M. Steadle, Jr., Waverly, N.Y., assignor to Ingersoll-Rand Company, New York, N.Y., a corporation of New Jersey
Filed Mar. 19, 1962, Ser. No. 180,716
1 Claim. (Cl. 144—32)

This invention relates to motor driven fastener driving apparatus and in particular to improvements in such apparatus to provide for automatically adjusting the position of the fastener engaging implement of the apparatus during operation thereof.

In the assembly of machinery there are instances in which access to numerous nuts, bolts, and screws is rather difficult, requiring the use of especially designed tools. In such instances the commony known motor driven fastener driving apparatus can only be used to fasten the readily accessible nuts, bolts, and screws which are positioned in axial alignment with the motor spindle of the apparatus and in an unobstructed path of movement of the fastener engaging implement of the apparatus. When, however, the less readily accessible nuts, bolts, and screws, such as those obstructed from the path of longitudinal movement of the fastener engaging implement of the apparatus, are to be fastened, an additional tool is used while the fastener driving apparatus remains inoperative.

One object of this invention is to provide a fastener driving apparatus for use in all instances even where the nuts, bolts, or screws to be fastened are not readily accessible.

Another object of this invention is to provide a fastener driving apparatus which is simple, effective and economical.

Further objects and advantages will become apparent from the following description of an illustrative embodiment of the present invention.

Figure 2:
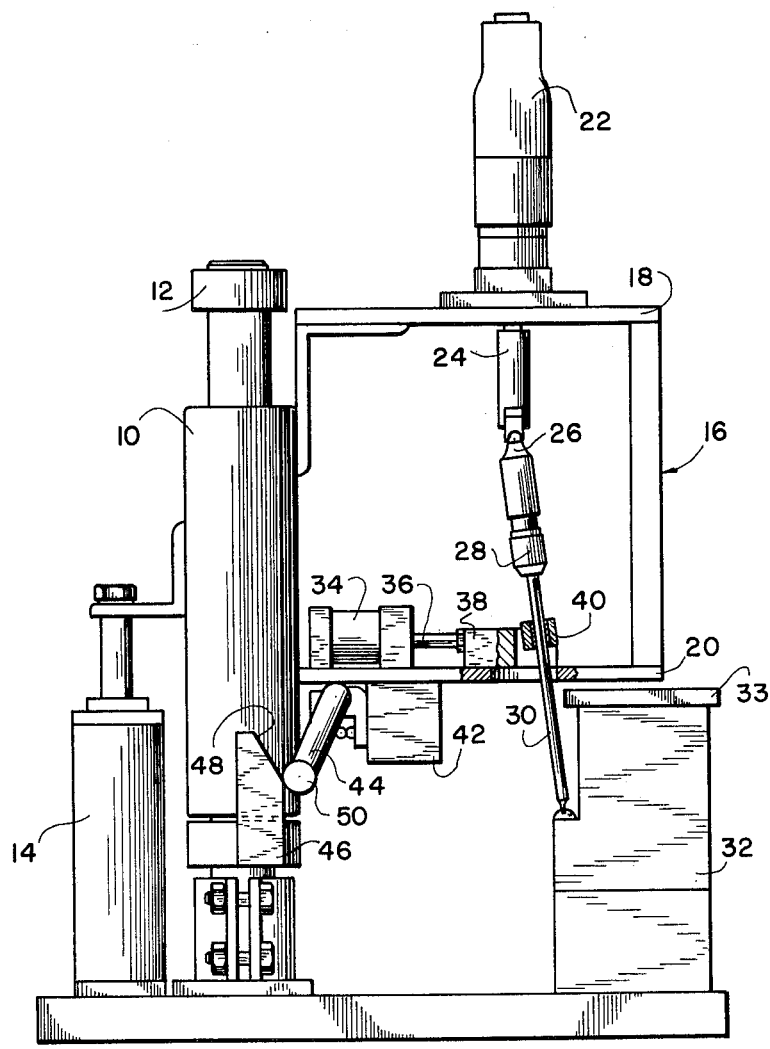

In the drawing:

FIGURE 1 is a view in side elevation of the apparatus in which the fastener engaging implement is held in axial alignment with the axis of the motor spindle, FIG. 2 is a view in side elevation of the apparatus in which the fastener engaging implement is held angularly relative to the axis of the motor spindle, and FIG. 3 is a fragmentary cross-section on line 3—3 of FIG. 1.

Referring to FIGS. 1 and 2, numeral 10 designates a column mounted on a guide 12 and connected to a motor 14 of the rectilinear type, column 10 to be longitudinally moved, raised and lowered, by motor 14 in a commonly known manner. A frame 16 is connected to column 10 for longitudinal movement therewith and includes an upper support member 18 and a lower support member 20. A motor 22 of a commonly known rotary type is mounted on upper support member 18, motor 22 having its spindle 24 extending downwardly and attached to a flexible coupling or universal joint 26 which in turn is connected to a chuck 28. A fastener engaging implement 30 having its shank rigidly held in chuck 28 is provided to engage and rotate fasteners to be screwed in a workpiece 32.

From the foregoing it is readily apparent that in providing a universal joint between the motor spindle 24 and chuck 28, the fastener engaging implement 30 can be positioned and rotated in various angular positions relative to the axis of motor spindle 24. The angular positions of the implement relative to the motor spindle, including the position in which the implement is in axial alignment with the motor spindle, may vary from that position in which the implement is in axal alignment with the motor spindle to a position up to a thirty degree angle with the motor spindle. The position of the implement 30, as illustrated in FIG. 2, is in particular useful where the fastener to be engaged is positioned under an overhang or projection 33 and inaccessible for a type fastener driving apparatus having a fastener engaging implement which is rigidly attached to the motor spindle.

In order to position the implement 30 angularly relative to the axis of spindle 24, means is provided to automatically adjust the position of implement 30 during downward movement of the implement, including the frame and motor, towards the fastener in the workpiece. This means includes a commonly known rectilinear type motor 34 mounted on lower support member 20 and having its piston rod 36 connected to actuate a guide member 38 horizontally along the upper surface of lower support member 20. Guide member 38 is provided with a guide bushing 40 pivotally mounted at the forward end portion of the guide member to slidably receive the implement 30, and automatically adjusting itself according to the position of the implement.

Operation of motor 34 is controlled by a valving arrangement (not shown) in a valve casing 42 operatively connected to motor 34 and actuated by a lever arm 44 which in turn is actuated when cam follower 50 connected to lever arm 44 engages a cam member 46 connected to the lower end portion of guide 12 for column 10. Cam member 46 is provided with an angularly positioned cam surface 48 which forces cam follower 50 and lever arm 44 to the right upon engagement of the cam follower with the cam surface during downward movement of the frame 16 from the position shown in FIG. 1, to cause the forward end of implement 30 to be angularly directed, see FIG. 2, relative to the axis of the motor spindle 24, towards the associated fastener in the workpiece 32. When frame 16 is moved upwardly from the position shown in FIG. 2, cam follower 50 and lever arm 44 are forced to the left causing implement 30 to be repositioned in its initial position after disengagement of cam follower 50 from cam surface 48. It is to be noted that the valving arrangement (not shown) and motor 34 with its piston rod 36 are adapted to provide for positioning and holding the guide bushing 40 and implement 30 in a predetermined position relative to the axis of motor spindle 24, prior to and after actuation of lever arm 44 to the right and to the left, respectively.

In operation, after the workpiece 32 is suitably positioned for operations of the fastener engaging implement 30 on the fasteners disposed under the outwardly projecting upper section 33 of workpiece 32, frame 16 is actuated downwardly by motor 14 in a commonly known manner from the position shown in FIG. 1. In this position, the motor 22, spindle 24, chuck 28, and implement 30 are axially aligned. During downward movement of the frame, cam follower 50 of lever arm 44 engages cam surface 48 of cam member 46, forcing lever arm 44 to the right to cause the valve arrangement (not shown) in valve casing 42 to operate motor 34 to actuate piston rod 36 and guide member 38 to the right, see FIG. 2. Actuation of guide member 38 including guide bushing 40 to the right, causes the fastener engaging implement 30 to pivot about universal joint 26 and to be positioned angularly relative to the axis of the motor spindle 24 with its forward end directed for engagement with the associated fastener in the workpiece, as shown in FIG. 2. When the fastener engaging implement 30 is properly positioned, motor 22 is rotated to rotate the spindle 24, universal joint 26, chuck 28, and the fastener engaging implement 30 to perform its fastening operations.

When the fastening operations on the associated screws are performed, frame 16 is actuated upwardly by motor 14 from the position shown in FIG. 2. During upward movement of the frame, cam follower 50 of lever arm 44 is disengaged from cam surface 48 of cam member 46, causing lever arm 44 to be forced to the left to operate motor 34 to actuate piston rod 36 and guide member 38 to the left, see FIG. 1. Actuation of the guide member to the left causes the fastener engaging implement 30 to pivot about universal joint 26 and to be repositioned in its initial position in axial alignment with the axis of the motor spindle 24.

The apparatus according to this invention is very simple in construction and may be employed in a wide variety of uses, such as for screw driving, nut running and reaming operations.

While one embodiment of the present invention is shown and described in detail, it is to be understood that various changes and modifications may be made without departing from the spirit and scope of the invention as set forth in the appended claim.

I claim:

In a fastener driving apparatus comprising a guide support means, a first motor mounted for longitudinal movement relative to said guide support means and having a rotary spindle extending from said motor, a fastener engaging implement having one end adapted to engage fasteners, a universal-joint connection between the free end of said spindle and the other end of said implement to flexibly transmit rotary motion from said spindle to said implement, a second motor connected to said implement to actuate said implement to pivot about said flexible connection into various angular positions relative to said spindle, control means for said second motor to control actuation of said implement, and cam means on said guide support means and operatively engageable by said control means in response to longitudinal movement of said first motor and spindle to operate said control means.

References Cited in the file of this patent

UNITED STATES PATENTS

| | | |
|---|---|---|
| 658,670 | Nash | Sept. 25, 1900 |
| 1,778,849 | De Reign | Oct. 21, 1930 |
| 1,971,344 | Hardy | Aug. 28, 1934 |
| 2,722,812 | Golasky | Nov. 8, 1955 |
| 2,787,303 | Coder | Apr. 2, 1957 |
| 2,806,494 | Kull | Sept. 17, 1957 |